United States Patent [19]

Camph

[11] Patent Number: 4,638,893

[45] Date of Patent: Jan. 27, 1987

[54] MEANS FOR TRANSMITTING BRAKE FORCE

[76] Inventor: Sven E. Camph, Flygarevägen 9F, S-236 00 Höllviksnäs, Sweden

[21] Appl. No.: 673,349

[22] Filed: Nov. 20, 1984

[51] Int. Cl.⁴ ............................................. F16D 65/56
[52] U.S. Cl. .............................. 188/79.5 GE; 74/110; 188/196 BA; 403/124
[58] Field of Search ............ 188/196 BA, 196 B, 216, 188/217, 79.5 R, 79.5 GE, 79.5 K, 79.5 P, 79.5 GC, 329, 330, 339, 338, 250 F; 74/110; 403/124, 114, 122; 384/192, 206, 207; 192/78, 111 A, 70.25

[56] References Cited

U.S. PATENT DOCUMENTS

| | | | |
|---|---|---|---|
| 3,589,756 | 6/1971 | Pruvot | 403/124 |
| 3,891,068 | 6/1975 | Camph | 188/196 BA |
| 4,161,999 | 7/1979 | Camph | 188/196 BA |
| 4,185,544 | 1/1980 | Kolar | 403/124 X |
| 4,287,968 | 9/1981 | Stensson et al. | 403/124 X |

FOREIGN PATENT DOCUMENTS 518861  3/1940  United Kingdom ............... 403/124

Primary Examiner—Douglas C. Butler
Attorney, Agent, or Firm—Laurence R. Brown

[57] ABSTRACT

In a key activated vehicle drum brake telescopically displaceable variable force transmitting elements have been arranged between the key and the brake shoes of the brake. In order to provide a design counteracting axial displacement of the brake shoes the variable force transmitting elements and the brake shoes have interengaging contact surfaces, the curve radius of the ends of the elements in a plane containing the drum axis are more than twice the curve radius of the same surfaces in planes perpendicular thereto.

1 Claim, 8 Drawing Figures

MEANS FOR TRANSMITTING BRAKE FORCE

BACKGROUND OF THE INVENTION

1. Field of the Invention

This invention relates to means for transmitting brake force between a brake activating key and a brake shoe in a drum brake, said means comprising first and second interengaging, threaded elements a relative rotation of which will cause variation of their total axial length, the remote end surfaces of said means having curved surfaces engaging surfaces on said key and said brake shoe.

2. Description of the Prior Art

The purpose of providing means having variable total length is to be able to compensate for brake shoe lining wear and drum brake wear, thus maintaining the angular movements of the key during braking independent of the wear of the braking surfaces on the drum and the brake lining. The relative rotation of the two elements of the means may be caused manually, but advantageously by an automatic slack adjusting device.

However, the use of a compression force transmitting element between the brake key and the brake shoe has hitherto caused certain problems in the brake due to the use of axially movable brake shoes—i.e. brake shoes movable in the direction of the axis of the brake drum——and due to the use of spherically shaped surfaces for the force transmission between the key and the brake force transmission means as well as between said means and the brake shoe.

An axial displacement of the brake shoe will involve a greater angular displacement of the brake key in order to activate the brake and this will in turn involve a longer piston-stroke of the pneumatic piston-cylinder brake activator usually used in the larger type of vehicles generally using this type of brake. A longer piston stroke may result in insufficient brake force and in insufficient brake activating time.

In case the brake is equipped with an automatic slack adjusting device for performing the above mentioned relative angular displacement of the two elements of the brake force transmission means, an axial displacement of the brake shoe will cause an increase of the piston stroke necessary for application of the brake and the adjuster will function as if the braking surfaces had been exposed to wear i.e. the automatic slack adjuster will reduce the slack between the braking surfaces and said slack may even become negative making it impossible to release the brake.

OBJECT OF THE INVENTION

The object of the present invention is to avoid said drawbacks by eliminating the tendency to axial displacement of the brake shoe in a brake having brake force transmission means of the type referred to above.

SUMMARY OF THE INVENTION

According to the present invention this is obtained thereby that the end surface of the element engaging the brake shoe has a curve radius in a plane containing the axis of the brake drum which is at least twice the curve radius of the same surface in a plane perpendicular to said axis.

There is no upper limit for the magnitude of said curve radius in a plane containing the axis of the brake drum. Therefore, a cylindrically shaped end surface of the brake shoe is applicable.

BRIEF DESCRIPTION OF THE DRAWINGS

In the accompanying drawings

DETAILED DESCRIPTION OF THE DRAWINGS

Figure 1:
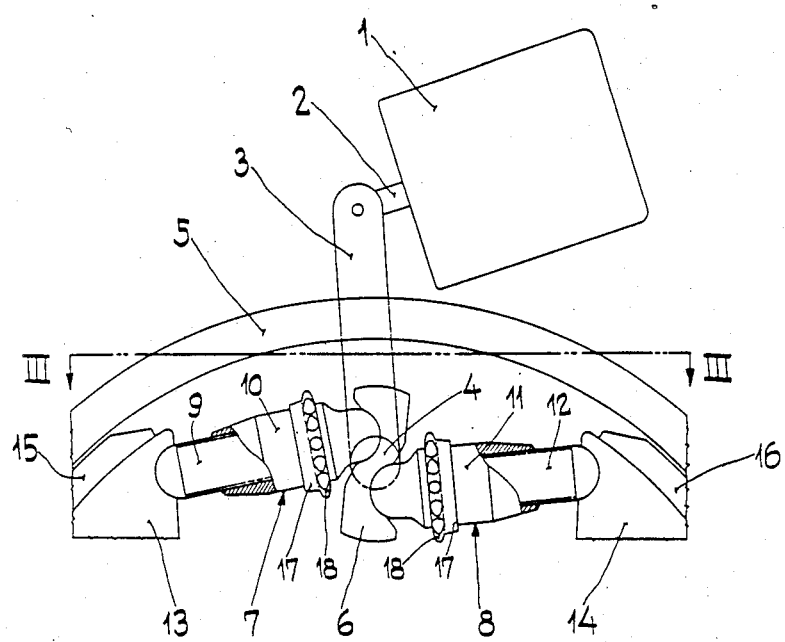
FIG. 1 schematically shows a part of a drum brake in vertical section in the released brake position.

The brake shown in FIG. 1 comprises a cylinder-piston activator 1 having a piston rod 2 which at its outer end is pivotally connected to a lever 3 rigidly connected to a key shaft 4 protruding into a brake drum 5 rigidly connected to a wheel (not shown).

The key shaft 4 carries a brake key 6 having double-curved concave depressions adapted to receive double-curved convex end surfaces of force transmitting means 7, 8 each of which comprising first and second interengaging, threaded elements 9, 10 and 11, 12 respectively. Said means 7, 8 act upon brake shoes 13, 14 provided with linings 15 and 16 respectively. FIG. 1 shows the parts of the brake when in their released brake positions leaving gaps between the linings 15, 16 and the inner surface of the drum 5.

Figure 2:
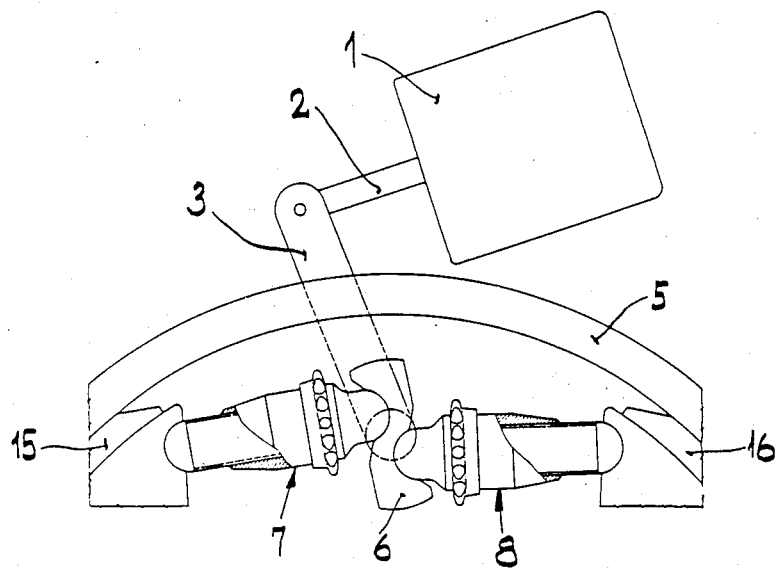
FIG. 2 shows the brake of FIG. 1 in the applied brake position.

A braking cycle is initiated by supplying compressed air to the activator 1. This will cause the rod 2 to be expelled and turn the key shaft 4 and the key 6 in such direction as to cause such movements of the means 7, 8 that the brake shoes will reach contact with their linings 15, 16 against the drum 5. This position is shown in FIG. 2.

It will be understood that wear on the linings 15, 16 and the drum 5 inherently may have a detrimental influence on the brake as it may cause a decrease in the force transmitted and an increase of the time necessary for obtaining application of the brake.

Therefore, it has been made possible to increase the length of the means 7, 8 corresponding to the wear of the braking surfaces of the brake and thus maintain the characteristics of the brake. This increase in length is effected by angular relative displacement of the threaded elements 9, 10 and 11, 12 respectively. The elements 10 and 11 are interiorly threaded sleeves adapted to receive the correspondingly threaded elements 9 and 12. The relative angular displacement is effected by influencing the sleeves 10, 11 which are provided with a circumferential tooth rack 17 carrying a number of teeth 18, either manually or preferably by automatic adjusting means (not shown).

Figure 3:
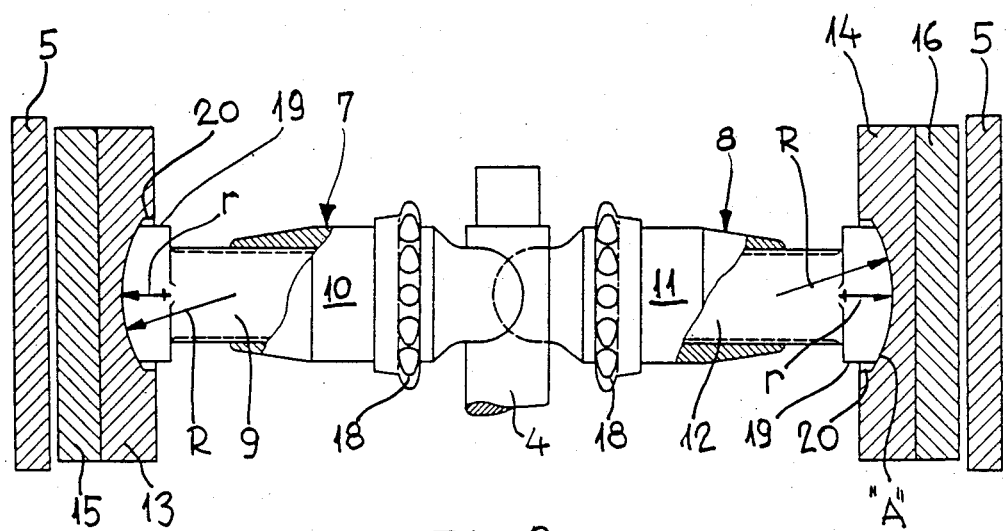
FIG. 3 shows means according to the invention viewed in the direction III—III of FIG. 1.
Figure 4:
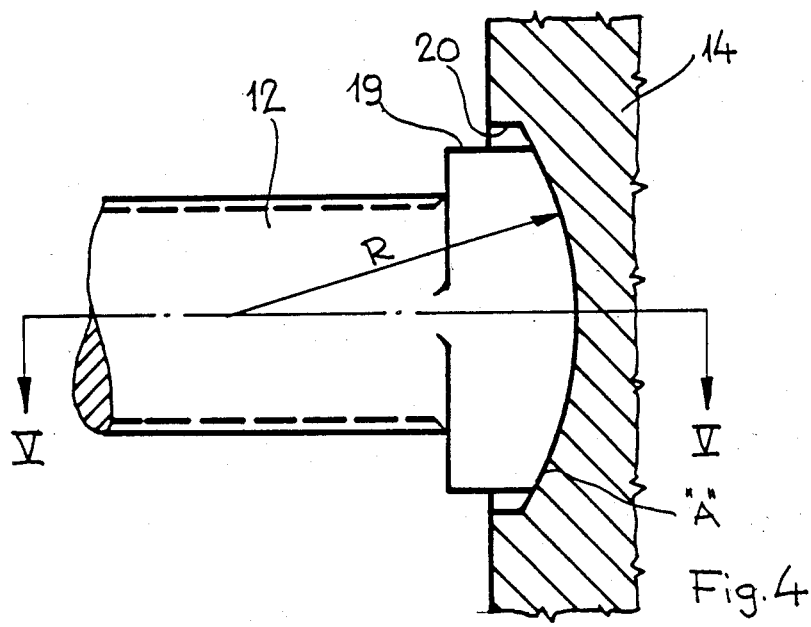
FIG. 4 is a part of FIG. 3 at a larger scale.
Figure 5:
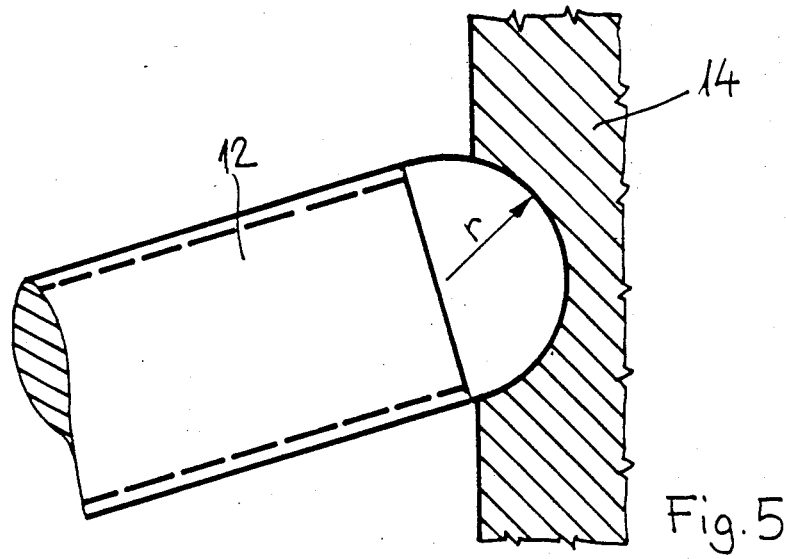
FIG. 5 is a section along the line V—V of FIG. 4.

Hitherto the compression force transmitting means 7, 8 have been provided with spherically shaped ends allowing axial displacements of the brake shoes 13, 14 relative the drum 5. The possibility of axial displacement has been avoided by the designs according to the invention which are shown in FIGS. 3-8. In FIGS. 3, 4 and 5 the end surfaces of the means 7, 8 contacting the brake shoes 13, 14 have double curvature. In the plane of FIGS. 3 and 4 containing the axis of the drum brake the curve radius of said surfaces is more than twice the radius r of the same end surfaces in directions perpendicular to the axis of the drum brake—e.g. the plane of FIG. 5.

The brake shoes 13 and 14 have correspondingly shaped concave surfaces. However, the concave surfaces on the brake shoes 13, 14 are somewhat depressed so as to provide oppositely directed shoulder surfaces 19, 20 on the elements 9, 12 and on the brake shoes 13, 14 respectively as shown best in FIG. 4. Said shoulder surfaces 19, 20 allow relative sliding between the convex and concave surfaces in the plane of FIG. 5, but prevent relative sliding in the plane of FIGS. 3 and 4. Therefore, any axial displacement of e.g. the brake shoe 14 in the direction upwards in FIGS. 3 and 4 relative the drum 5 will cause contact between the convex and the concave surfaces in the area marked "A", while there will be formed an increasing gap between the surfaces in the direction upwards.

However, a compression force in the area "A" on the brake shoe 14 will have a downwardly directed component force tending to return the brake shoe 14 to its symmetrical position.

Figure 6:
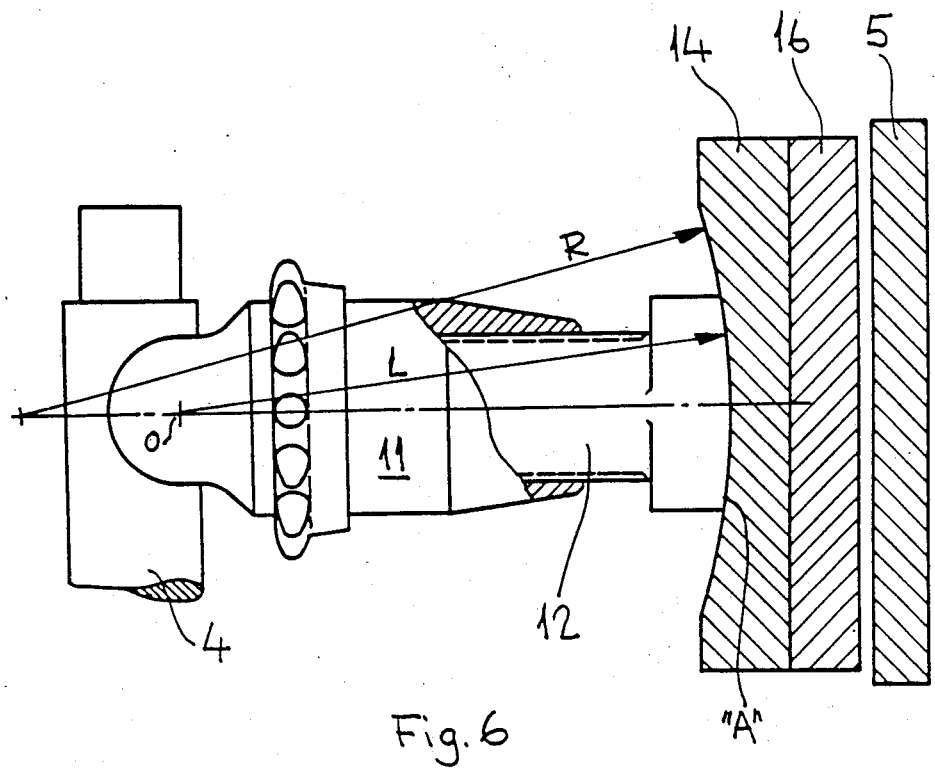
FIG. 6 shows other means according to the invention.

FIG. 6 shows an embodiment in which the curve radius R of the concave and convex surfaces in a plane containing the axis of the drum is greater than the active length L of the force transmitting means consisting of the elements 11, 12. An axial displacement upwards of the brake shoe 14 in FIG. 6 will cause an angular displacement of the means 11, 12 around a pivot center O defined by the coacting surfaces on the element 11 and the brake key 6. Again the contact between the element 12 and the brake shoe 14 will occur in the are "A" and a gap of increasing size upwards will arise between the double curved surfaces on the elements 12 and the brake shoe 14. Consequently during braking a restoring axial force will arise on the brake shoe 14.

It will be understood that in the embodiment of FIG. 6 no means preventing sliding between the convex and convave surfaces on the force transmitting means and the brake shoe respectively are necessary in order to ensure that an axial correcting force will act on the brake shoes in case an undesired axial displacement of said shoes has occurred.

Figure 7:
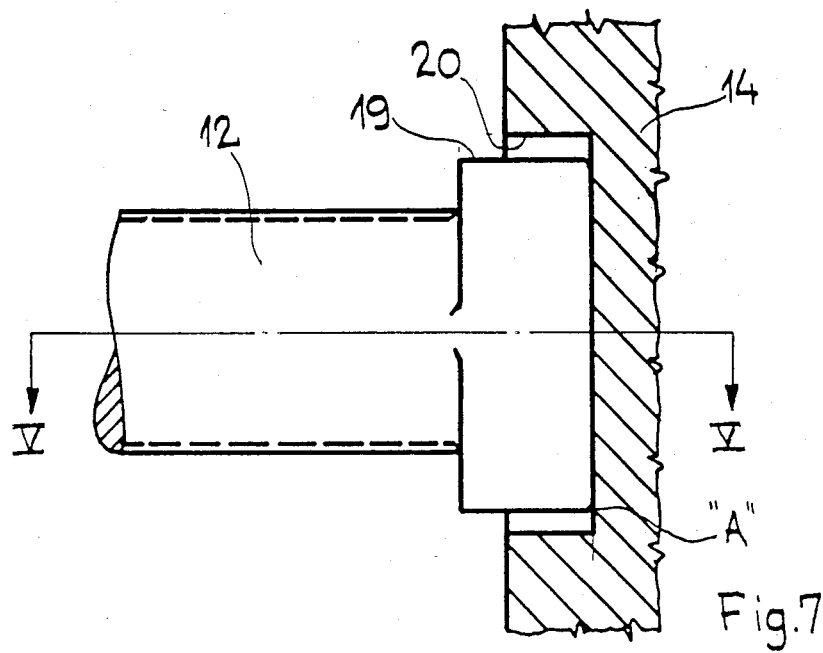
FIGS. 7 and 8 show a further embodiment of the invention.
Figure 8:
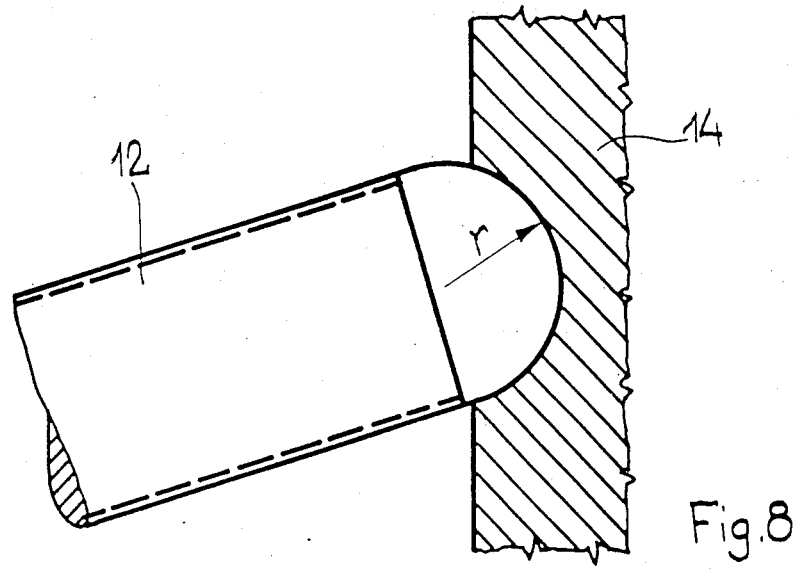

The embodiment of FIGS. 7 and 8 differs from that of FIGS. 4 and 5 in that while the radius r in the plane perpendicular to the axis of the brake drum (the plane of FIGS. 5 and 8) is unaltered, the radius R of the curvature of the brake shoe engaging surface in a plane containing the axis of the brake drum (the plane of FIGS. 4 and 7) has increased indefinitely in FIG. 7 from the—rather long—radius R in FIG. 4. This involves that the brake force transmitting surfaces at the brake shoe 14 theoretically become cylindrical. In practical use the wear and plastic deformations of the surfaces will make them slighty double-curved.

I claim:

1. A braking system having a brake activating key and a brake shoe in a drum brake comprising a pair of variable length force transmitting elements one end of each of which engages the activating key and is actuated thereby, the other end of each force transmitting element having a convex cylindrical contact surface, said brake shoe (14) having a concave cylindrical contact surface of greater area of contact than the curved surface of said convex cylindrical surface, said convex and concave surfaces being complemental between said force transmitting elements and said brake shoe, means comprising the concave surface of greater area than the convex surface being shaped for mating in relative sliding contact with the convex surface in a limited direction which prevents relative sliding movement in the axial direction of the drum brake, the radius of said cylindrical curved surfaces of said force transmitting elements and the brake shoe being greater than the length of said force transmitting elements and lying in a plane containing the axis of the brake drum making the mating contact surface of the convex element engage the brake shoe cylindrical surface over an arc having a radius L.

* * * * *